UNITED STATES PATENT OFFICE 2,357,912

PREPARATION OF INTERMEDIATES

George W. Seymour and Victor S. Salvin, Cumberland, Md., assignors to Celanese Corporation of America, a corporation of Delaware No Drawing. Application March 14, 1940,
Serial No. 323,894

7 Claims. (Cl. 260—562)

This invention relates to the preparation of dyestuff intermediates and relates more particularly to a novel process for the preparation of intermediates in the synthesis of azo dyes.

An object of this invention is to provide a novel process whereby N-dialkyl-amino acyl substituted anilines may be produced in high yield and in desirable purity.

A further object of this invention is to provide a method of synthesizing said dyestuff intermediates in which the number of necessary operative steps is decreased and in which a minimum amount of equipment is needed.

Other objects of this invention will appear from the following detailed description.

In the preparation of organic compounds, and particularly in the preparation of N-dialkyl-amino-acyl anilines and substituted N-di-hydroxyalkyl-amino-acyl anilines which are to be used as dyestuff intermediates, it is essential that the purity of the compounds be maintained. Ordinarily, not only must the compounds being synthesized be separated from the solvents used in the reaction throughout the various steps in the process, but they must also be separated from isomers and other by-products of the reaction. Such a procedure obviously involves both mechanical and solvent losses in the various reaction steps so that the yield is thereby considerably decreased.

We have now discovered a novel method by which said N-dialkyl-amino acyl or substituted N-di-hydroxyalkyl-amino acyl anilines may be prepared in high yield and in pure form without the necessity for the separation and purification of the intermediate products of the reaction at each stage of the process.

According to our invention, N-dialkyl, N-dialkyloxy or N-diacylalkyl aromatic amines may be converted into the respective N-dialkyl-, N-dialkoxyalkyl- or N-di-acylalkyl-amino acyl anilides by nitrating said amines, reducing the nitro group thus introduced to an amino group, followed by the acylation of the amino group, said steps being carried out in an aqueous medium.

Our process is particularly suitable for the preparation of N-dialkyl-amino-acyl anilides which are water-soluble in the unacylated or free amine form. The compounds, which may be prepared according to my invention, may be represented by the following general formula

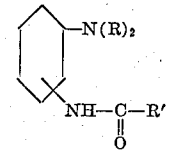

where R is an alkyl or an etherified or esterified hydroxyalkyl group, and

is the residue of an organic acid. The benzene nucleus may be further substituted by water-solubilizing groups. More particularly, R may be a methyl, ethyl, methoxyethyl, acetoxyethyl, propyl or an unsaturated alkyl group such as the allyl group, while the acyl substituent containing R' may be the residue of an acid such as formic, acetic, propionic or butyric acid or hydroxy acid such as lactic acid or hydroxy butyric acid. The water-solubilizing groups which may be further contained in the nucleus are such groups as the OH, O-alkylene-OH, CN or $SO_2NH_2$. Other water solubilizing groups may be equally suitable. Such compounds as N-dimethyl aniline, N-diethyl aniline, N-di-methoxyethyl aniline, N-di-ethoxyethyl aniline, N-dipropyl aniline, chlor-N-dimethyl aniline and N-diallyl aniline and also those amino compounds containing one or more of the above mentioned water-solubilizing groups are suitable in my process. More particularly, those N-substituted dialkyl or dihydroxyalkyl amines which orient to the meta position upon nitration are preferred.

The nitration of said amino compounds is carried out in an aqueous medium and it is not essential that anhydrous conditions be maintained. The temperature during the nitration msut be kept low, however, to prevent excessive nitration of the amine. Temperatures up to about 20° C. are suitable but preferably the temperatures should be kept at about 5° C. or lower during the nitration reaction.

Reduction of the nitro groups thus introduced is also carried out in an aqueous medium after insoluble matter is filtered from the solution in which the nitration is carried out. While the reduction may be carried out in the presence of such reducing agents as iron filings and hydrochloric acid, iron filings and acetic acid, tin or stannous chloride and hydrochloric acid, alcoholic ammonium sulphide, or by electrochemical methods, etc. we prefer to use zinc dust in conjunction with the residual acids of nitration remaining in the solution after the nitration has proceeded to the desired extent. The use of zinc dust as the reducing agent for the nitro compound obviates the necessity for extracting the sludge which remains after reduction to remove any occluded amine therefrom. When iron is used as the reducing agent, the sludge filtered from the solution containing the reduced amine retains a portion of the amine by occlusion, and in order to avoid undue loss the sludge must be extracted with a solvent for the occluded amine. Where zinc is used this extraction step is unnecessary since there is relatively little occlusion in the zinc sludge filtered from the solution.

We have discovered that it is not necessary to isolate the amines obtained by the above reduction in order to carry out the acylation thereof since the acylation may be carried out in the aqueous medium which contains the reduced nitro compound. The amine may be acylated using the desired acid anhydride. To determine the completeness of acylation, an acidified portion of the aqueous solution of amine may be titrated with a nitrite solution. Free amine, if present, will be diazotized and an excessive amount of the nitrite solution consumed. This condition can be corrected by continuing the acylation.

In order to further illustrate our invention but without being limited thereto the following example is given:

Example 1,600 lbs. of 98% $H_2SO_4$ are charged into a nitrator together with 400 lbs. of N-diethylaniline. During the addition of the diethyl-aniline the temperature of the mixture is not permitted to rise above 15° C. The mixture is stirred and the stirring continued for 4 to 5 hours. 460 lbs. of commercial mixed acids (40% $HNO_3$ anhydrous) are then added, the temperature being kept below 5° C. during the course of the nitration. The mixture is stirred from 4 to 5 hours and then drowned in a mixture of 3,000 lbs. of ice and 6,000 lbs. of water. To this drowned mixture are added 800 lbs. of 50% caustic soda and the whole mixture again stirred for 4 to 5 hours. 110 lbs. of para-nitro-N-diethyl aniline are isolated from solution by filtration. The meta-nitro-N-diethyl aniline is obtained in solution in an amount 74% of the theoretical based on the N-diethyl aniline used.

To this filtrate is added 400 to 500 lbs. of zinc dust over a period of 3 to 4 hours and the temperature held at 70° C. The reduction is complete when the solution becomes almost colorless. The zinc sludge is filtered off and the filtrate neutralized to a faint blue on Congo paper (with 50% caustic soda solution). The final neutralization is carried out by adding 25 to 35 lbs. of sodium acetate.

An excess of 120 to 125 lbs. of sodium acetate is then added, followed by the addition of 400 to 500 lbs. of acetic anhydride. The mixture is warmed to 40° to 50° C. and stirred for 1 to 2 hours. Stirring and/or the addition of further acetic anhydride should be continued until the acetylation reaction is complete.

The test for completeness of acetylation is as follows: A 200 cc. sample is iced to 0° C. and acidified with hydrochloric acid. This solution is titrated with normal nitrite solution. If the sample takes 5 cc. or less, acetylation is complete. If more than 5 cc. are taken, acetylation is continued, with the addition of anhydride if needed. The solution is then made slightly alkaline by the addition of 400 to 500 lbs. of soda ash and the mixture allowed to stand 10 to 12 hours for separation. The lower aqueous phase is removed and the upper oily layer is then ready for dispersion if it is to be used in this manner.

The yield of the acetylated meta-N-diethylamino acetanilide is 500 to 550 lbs. or approximately 100% of theory based on the amino compound. The overall yield based on diethylamine is 70%. The term "alkyl" as employed hereinafter in the claims is to be construed as including within its scope hydroxy alkyl and other substituted alkyls.

It is to be understood that the foregoing detailed description is given merely by way of illustration and that many variations may be made therein without departing from the spirit of our invention.

Having described our invention, what we desire to secure by Letters Patent is:

1. Process for the preparation of N-dialkyl-amino-acyl anilides, which comprises nitrating a N-dialkyl-aniline in sulphuric acid, diluting the nitration mixture with water, partially neutralizing the diluted nitration mixture whereby insoluble isomeric nitro compounds are precipitated, removing said precipitated nitro compounds, treating the remaining acid solution with a reducing agent to reduce the soluble nitro compound contained therein and thereafter acylating the resulting amino derivative with a lower aliphatic acid anhydride in the same liquid.

2. Process for the preparation of N-dialkyl-amino-acetanilides, which comprises nitrating a N-dialkyl-aniline in sulphuric acid, diluting the nitration mixture with water, partially neutralizing the diluted nitration mixture whereby insoluble isomeric nitro compounds are precipitated, removing said precipitated nitro compounds, treating the remaining acid solution with a reducing agent to reduce the soluble nitro compound contained therein and thereafter acylating the resulting amino derivative with acetic anhydride in the same liquid.

3. Process for the preparation of N-dialkyl-amino-meta-acetanilides, which comprises nitrating a N-dialkyl-aniline in sulphuric acid, diluting the nitration mixture with water, partially neutralizing the diluted nitration mixture whereby insoluble para-nitro compounds are precipitated, removing said precipitated nitro compounds, treating the remaining acid solution with a reducing agent to reduce the soluble nitro compound contained therein, and thereafter treating in the same liquid the resulting amino derivative with acetic anhydride.

4. Process for the preparation of meta-N-diethyl-amino-acetanilide, which comprises nitrating N-diethyl-aniline in sulphuric acid, diluting the nitration mixture with water, partially neutralizing the diluted nitration mixture whereby insoluble para-nitro compounds are precipitated, removing said precipitated nitro compounds, treating the remaining acid solution with a reducing agent to reduce the soluble nitro compound contained therein, and thereafter treating in the same liquid the resulting amino derivative with acetic anhydride.

5. Process for the preparation of meta-N-diethyl-amino-acetanilide, which comprises nitrating N-diethyl-aniline in sulphuric acid, at a temperature at most 5° C., diluting the nitration mixture with water, partially neutralizing the diluted nitration mixture whereby insoluble para-nitro compounds are precipitated, removing said precipitated nitro compounds, treating the remaining acid solution with a reducing agent to reduce the soluble nitro compound contained therein, and thereafter treating in the same liquid the resulting amino derivative with acetic anhydride.

6. Process for the preparation of meta-N-diethyl-amino-acetanilide, which comprises nitrating N-diethyl-aniline in sulphuric acid at a temperature at most 5° C., diluting the nitration mixture with water, partially neutralizing the diluted nitration mixture whereby insoluble para-nitro-N-diethyl-amino benzene is precipitated, removing said precipitated para-nitro compound, adding zinc dust to the remaining acid solution to reduce the meta-nitro compound contained therein, and thereafter treating in the same liquid the resulting amino derivative with acetic anhydride.

7. Process for the preparation of meta-N-diethyl-amino-acetanilide, which comprises nitrating N-diethyl-aniline in sulphuric acid at a temperature at most 5° C., diluting the nitration mixture with water, partially neutralizing the diluted nitration mixture whereby insoluble para-nitro-N-diethyl-amino benzene is precipitated, removing said precipitated para-nitro compound, adding zinc dust to the remaining acid solution and maintaining the temperature of the solution at 70° C. to reduce the meta-nitro compound contained therein, and thereafter treating in the same liquid the resulting amino derivative with acetic anhydride.

GEORGE W. SEYMOUR.
VICTOR S. SALVIN.